United States Patent
Baek et al.

(10) Patent No.: US 9,872,317 B2
(45) Date of Patent: Jan. 16, 2018

(54) METHOD FOR CONTINUOUSLY PROVIDING EMERGENCY CALL SERVICE THROUGH PACKET NETWORK

(71) Applicant: Samsung Electronics Co., Ltd., Suwon-si, Gyeonggi-do (KR)

(72) Inventors: Youngkyo Baek, Seoul (KR); Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 15/033,712

(22) PCT Filed: Nov. 10, 2014

(86) PCT No.: PCT/KR2014/010738
§ 371 (c)(1),
(2) Date: May 2, 2016

(87) PCT Pub. No.: WO2015/069076
PCT Pub. Date: May 14, 2015

(65) Prior Publication Data
US 2016/0278132 A1  Sep. 22, 2016

(30) Foreign Application Priority Data

Nov. 8, 2013  (KR) .................. 10-2013-0135862
Feb. 24, 2014 (KR) .................. 10-2014-0021560

(51) Int. Cl.
*H04W 76/00* (2009.01)
*H04W 4/22* (2009.01)
(Continued)

(52) U.S. Cl.
CPC ........... *H04W 76/007* (2013.01); *H04W 4/22* (2013.01); *H04W 8/02* (2013.01); *H04W 8/18* (2013.01);
(Continued)

(58) Field of Classification Search
CPC ....... H04W 4/22; H04W 76/007; H04W 4/02; H04W 76/00; H04W 8/02; H04W 36/18; H04W 8/18; H04W 68/02
See application file for complete search history.

(56) References Cited

U.S. PATENT DOCUMENTS

2009/0047922 A1   2/2009 Buckley et al.
2010/0124897 A1*  5/2010 Edge ..................... H04M 7/123
                                                    455/404.1
(Continued)

FOREIGN PATENT DOCUMENTS

KR   10-2015-0014834 A   2/2015
WO    2012-111473 A1    8/2012

OTHER PUBLICATIONS

Blackberry UK Ltd., "Correcting handling of CS Service Notification message while the UE has an emergency bearer context", C1-134780, 3GPP TSG-CT WG1 #85, Nov. 1, 2013, San Francisco, USA.
(Continued)

*Primary Examiner* — Olumide T Ajibade Akonai
*Assistant Examiner* — Margaret G Mastrodonato
(74) *Attorney, Agent, or Firm* — Jefferson IP Law, LLP (57) ABSTRACT

A method and a device for maintaining an emergency call service through a packet network in a mobile communication network are provided. UE using VoLTE receives identification information indicating whether an IMS Voice over PS (VoPS) is supported from a network to determine whether the IMS VoPS of the network is supported, and processes paging for a CS voice call according to the determination result if the emergency call service continues through the packet network.

16 Claims, 7 Drawing Sheets (51) Int. Cl.
*H04W 36/18* (2009.01)
*H04W 8/18* (2009.01)
*H04W 8/02* (2009.01)
*H04W 68/02* (2009.01)
*H04W 4/02* (2009.01)

(52) U.S. Cl.
CPC .......... *H04W 36/18* (2013.01); *H04W 68/02* (2013.01); *H04W 76/00* (2013.01); *H04W 4/02* (2013.01)

(56) References Cited

U.S. PATENT DOCUMENTS

| | | |
|---|---|---|
| 2010/0255808 A1 | 10/2010 | Guo et al. |
| 2011/0189971 A1* | 8/2011 | Faccin .................. H04W 76/02 455/404.1 |
| 2011/0275342 A1* | 11/2011 | Ramle .................... H04W 4/22 455/404.1 |
| 2012/0188941 A1 | 7/2012 | Li et al. |
| 2013/0309993 A1 | 11/2013 | Nishida et al. |
| 2015/0358477 A1 | 12/2015 | Jeong et al. |

OTHER PUBLICATIONS

Martin Dolly AT&T Labs; "Discussion Paper: Active VoLTE call fails at VoLTE TA to non-VoLTE TA handover"; Nov. 4, 2013; 3GPP Draft; C1-134800; 3GPP; Mobile Competence Centre; 650; Route Des Lucioles; F-06921 Sophia-Antipolis Cedex; France; XP050746867.

3RD Generation Partership Project; "Technical Specification Group Services and System Aspects; General jacket Radio Service (GPRS) enhancements for Evolved Universal Terrestrial Radio Access Network (E-UTRAN) access (Release 12)"; Sep. 11, 2013; pp. 1-293; 3GPP; Mobile Competence Centre; 650; Route Des Lucioles; F-06921 Sophia-Antipolis Cedex; France; XP050712247.

3RD Generation Partership Project; "Technical Specification Group Core Network and Terminals; IP Multimedia (IM) Core Network (CN) subsystem IP Multimedia Subsystem (IMS) Service Continuity; Stage 3 (Release 3)"; Sep. 18, 2013; pp. 1-421; 3GPP Standard; 3GPP TS 24.237; 3GPP; Mobile Competence Centre; 650; Route Des Lucioles; F-06921 Sophia-Antipolis Cedex; France; XP050712548.

Samsung: "Emergency case handling"; 3GPP Draft; C1-091919; 3GPP Standard; 3GPP TS 24.237; Apr. 27, 2009; 3GPP; Mobile Competence Centre; 650; Route Des Lucioles; F-06921 Sophia-Antipolis Cedex; France; XP50337496.

Alcatel-Lucent et al.; "Access Domain Selection when an ongoing IMS voice over PS session"; 3GPP Draft; 23292_CR0211R1_SAESTE110_(REL-12)_S2-141421 REV 1034 23292 R12; Jun. 10, 2004; vol. SA WG2; 3GPP; Mobile Competence Centre; 650; Route Des Lucioles; F-06921 Sophia-Antipolis Cedex; France; XP050868911.

Blackberry UK Ltd et al.; "Keeping ongoing realtime and multimedia services if IMS VoPS change"; Dec. 2, 2013; 3GPP Draft; 24301_CR1868R3_(REL-12)_C1-135137-C1-134909-C1134878-C1-134779-24301-C20-TA-IMSVOPS; 3GPP; Mobile Competence Centre; 650; Route Des Lucioles; F-06921 Sophia-Antipolis Cedex; France; XP050729732.

* cited by examiner

METHOD FOR CONTINUOUSLY PROVIDING EMERGENCY CALL SERVICE THROUGH PACKET NETWORK

TECHNICAL FIELD

The present disclosure relates generally to a method for continuously providing an emergency call service through a packet network in a mobile communication network, and more particularly, to a method and a device for solving a problem that an emergency call is interrupted due to an incoming call while an emergency call service is provided through a packet network.

BACKGROUND ART

In general, a mobile communication system was developed for the purpose of providing a voice service while securing user's mobility. However, the area of the mobile communication system has been expanded gradually to data services in addition to voice services, and, at present, the mobile communication system has been developed to the extent of being capable of providing high-speed data services.

Nowadays, in the mobile communication system, there has been a need to solve a resource shortage problem due to providing of various services and to provide a greatly developed mobile communication system in accordance with a user demand to receive higher-speed services.

To cope with such a need, standardization of a Long Term Evolution (LTE) system in the $3^{rd}$ Generation Partnership Project (3GPP) is currently underway as one of the next-generation of mobile communication systems that are being developed. The LTE system is a technology to implement high-speed packet-based communication having a maximum transmission speed of about 100 Mbps. For this, there have been discussions on several schemes; for example, a scheme to reduce the number of nodes that are located on communication paths through simplification of the structure of a network and a scheme to make radio protocols maximally approach radio channels.

On the other hand, in order to support a voice call in an LTE network, Packet Switched (PS) type IMS-based Voice over LTE (VoLTE) technology may be used, or CS Fall Back (CSFB) technology that reuses a Circuit Switched (CS) type of a 2G/3D system may be used. In the LTE network, the term "VoLTE" is a wording that can be used in the same concept as Voice over IMS (VoIMS). Rather, in the LTE network, an emergency call may be serviced through the VoLTE.

The current LTE system may be constructed to accept an emergency call service or a VoLTE service in a partial area of the network and to non-accept the emergency call service or the VoLTE service in the remaining area. In this case, a VoLTE voice call is connected with respect to User Equipment (UE) in the VoLTE service acceptance area, and if the UE moves to the VoLTE service nonacceptance area, the ongoing VoLTE voice call is disconnected when a new voice call arrives in a CS domain even if the VoLTE voice call is maintained. In the same manner, an emergency call is connected with respect to the UE in the emergency call service acceptance area, and if the UE moves to the emergency call service non-acceptance area, the ongoing emergency call is disconnected when the voice call arrives in the CS domain even if the emergency call is maintained. Since such a voice call disconnection phenomenon may cause severe problems, there is a need to make researches in a method that can solve the voice call disconnection problems.

DISCLOSURE OF INVENTION

Technical Problem

The present disclosure has been made in order to solve the above problems, and an aspect of the present disclosure provides a method and a device that can maintain a specific service (e.g., emergency call service in a situation that UE moves between a partial network area in which voice service start is accepted and the remaining network area in which the service start is not accepted in a state where the service start is accepted in the partial network area and the service start is not accepted in the remaining network area) in accordance with a network construction and a load control method.

Solution to Problem

In one aspect of the present disclosure, a communication method for a network device that supports a packet-based voice service in a mobile communication system includes: recognizing that User Equipment (UE) is located in a Tracking Area (TA) in which the packet-based voice service is not supported on the basis of a message that is received from a Home Subscriber Server (HSS); if a call request message for the UE is received, determining whether a VoLTE call or an emergency call for the UE is ongoing; and if the VoLTE call or the emergency call for the LTE is ongoing, selecting a packet switched domain as a domain for the received call request message.

In another aspect of the present disclosure, a network device that supports a packet-based is voice service in a mobile communication system includes: a transceiver unit configured to communicate data with another device; and a control unit configured to recognize that User Equipment (UE) is located in a Tracking Area (TA) in which the packet-based voice service is not supported on the basis of a message that is received from a Home Subscriber Server (HSS), to determine whether a VoLTE call or tin emergency call for the UE is ongoing if a call request message for the UE is received, and to select a packet switched domain as a domain tin the received call request message if the VoLTE call or the emergency call for the UE is ongoing.

Advantageous Effects of Invention

According to various embodiments of the present disclosure, in the case where the area in which the emergency call or the VoLTE is supported and the area in which the emergency call or the VoLTE is not supported coexist, the emergency call and VoLTE call services can be seamlessly provided.

MODE FOR THE INVENTION

Hereinafter, preferred embodiments of the present disclosure will be described in detail with reference to the accompanying drawings. In the accompanying drawings, the same reference numerals are used for the same constituent elements. Further, detailed description of well-known functions or constructions incorporated herein will be omitted to avoid obscuring the subject matter of the present disclosure.

In describing embodiments of the present disclosure in detail, an OFDM-based radio communication system, particularly, the 3GPP EUTRA standard, will be a main application subject, and as a kind of specific service, VoLTE or an emergency call will be a main application subject. However, the main concept of the present disclosure can be applied to other communication systems and services adopting similar technical backgrounds and channel types with slight modifications within a range that does not greatly deviate from the scope of the present disclosure, according to the judgment of a person skilled in the art to which the present disclosure pertains. Further, technology described in the description with respect to the VoLTE can be applied to other IMS-based voice providing services (e.g., Voice over Wi-Fi) without great modifications.

Figure 1:
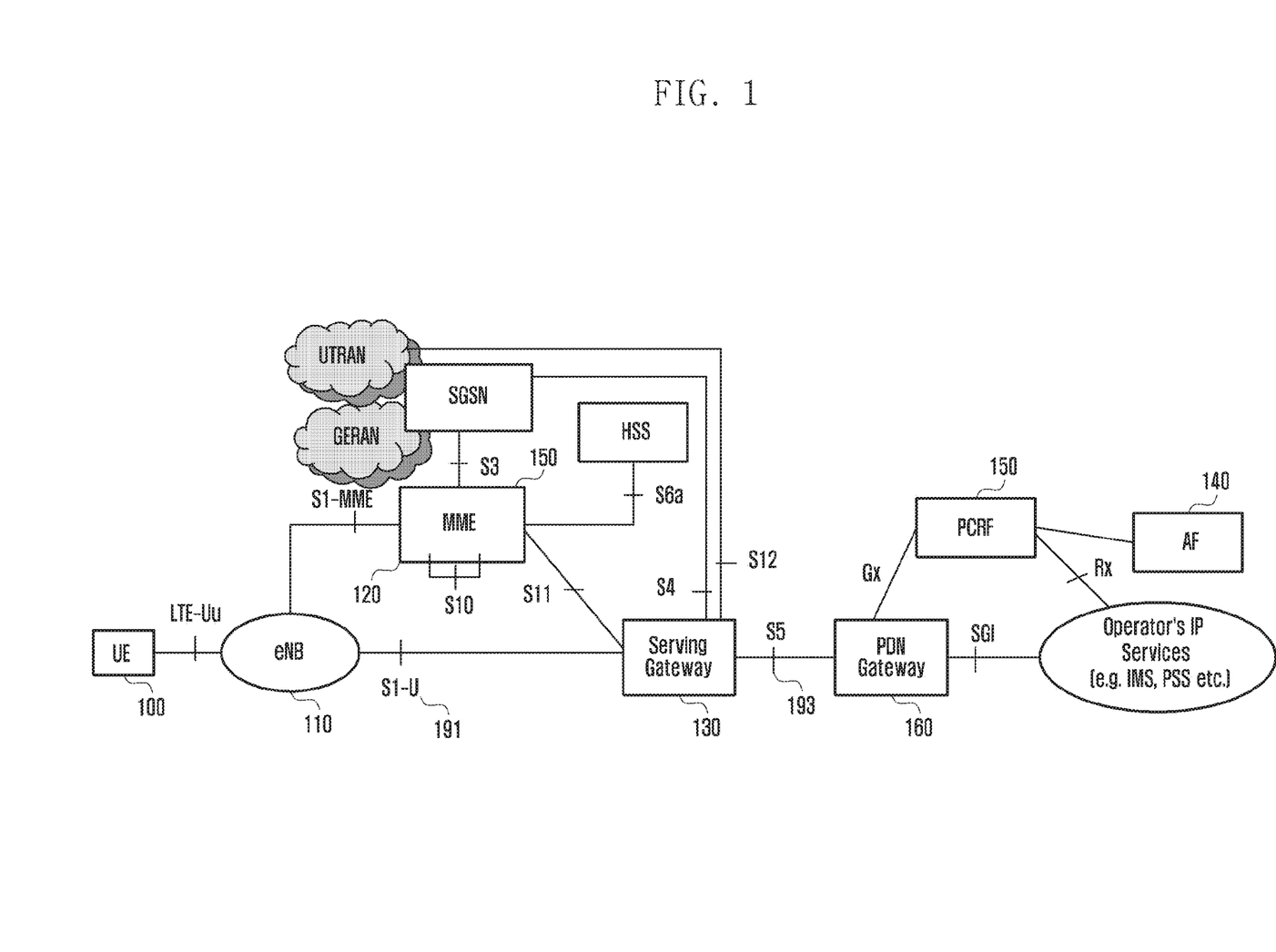
FIG. 1 is a diagram illustrating the structure of a general LTE mobile communication system.

FIG. 1 is a diagram illustrating the structure of a general LTE mobile communication system.

Referring to FIG. 1, a radio access network of an LTE mobile communication system includes an Evolved Node B (EUTRAN, hereinafter referred to as "ENB" or "Node B") 110, a Mobility Management Entity (MME) 120, and a Serving Gateway (S-GW) 130.

User Equipment (hereinafter referred to as "UE") 100 is connected to an external network through the ENB 110, the S-GW 130, and a Packet Data Network (PDN) Gateway (P-GW) 160.

The ENB 110 is a Radio Access Network (RAN) node, and corresponds to a Radio Network Controller (RNC) of a Universal Terrestrial Radio Access Network (UTRAN) system and a Base Station Controller (BSC) of a GSM Edge Radio Access Network (GERAN) system. The ENB 110 is connected to the UE 100 through a radio channel, and performs a similar role to the existing RNC/BSC. The ENB 110 can use several cells at the same time.

Since all user traffics including a real-time service, such as a Voice over IP (VoIP) that uses the Internet protocol are serviced through a shared channel in the LTE, a device that performs scheduling through gathering of status information of the UEs 100 is necessary, and the ENB 110 takes charge of this.

The MME 120 is a device that takes charge of various kinds of control functions, and one MME 120 may be connected to a plurality of ENBs.

The S-GW 130 is a device that provides a data bearer, and generates or removes the data bearer in accordance with the control of the MME 120.

An Application Function (AF) 140 is a device that exchanges application-related information with a user at an application level. The AF 140 may be, for example, a Service Centralization and Continuity Application Server (SCC AS) for supporting a voice service through a packet network. The SCC AS may perform a function of notifying of a pageable domain of the UE to make a phone call through Terminating Access Domain Selection (T-ADS).

A Policy Charging, and Rules Function (PCRF) 150 is a device that controls policy related to user's Quality of Service (QoS), and a Policy and Charging Control (PCC) rule that corresponds to the policy is transferred to the P-GW 160 to be applied. The PCRF 150 is an entity that generally controls the QoS and billing of the traffics.

In general, User Planes (UP) are called paths that connect between the UE 100 and the ENB 110 that is a RAN node, between the ENB 110 that is the RAN node and the S-GW 130, and between the S-GW 130 and the P-GW 160. Among the paths, the path that uses a radio channel having severe resource limits is the path between the UE 100 and the ENB 110 that is the RAN node.

In the radio communication system such as LTE, a unit to which the QoS can be applied is an Evolved Packet System (EPS) bearer. One EPS bearer is used to transmit IP flows having the same QoS requirements. A QoS-related parameter may be designated to the EPS bearer, which includes a QoS Class Identifier (QCI) and an Allocation and Retention Priority (ARP). The QCI is a parameter in which the QoS priority is defined as an integer value, and the ARP is a parameter that is used to determine whether to accept or reject generation of a new EPS bearer.

The EPS bearer corresponds to a Packet Data Protocol (PDP) context of a General Packet Radio Service (GPRS) system. One EPS bearer belongs to a PDN connection, and the PDN connection may have an Access Point Name (APN) as an attribute. If the PDN connection for an IP Multimedia Subsystem (IMS) service, such as Voice over LTE (VoLTE), is generated, the corresponding PDN connection should be generated using a well-known IMS APN.

In various embodiments, the mobile communication network may be constructed so that an LTE system and a legacy system coexist. That is, when constructing a network, partial network service providers of the mobile communication system may mixedly install a network in which an emergency call service or VoLTE is supported and a network in which the emergency call service or VoLTE is not supported. More specifically, explanation will be made on the basis of the Voice over LTE (VoLTE) that is a kind of voice service. The mobile communication network may be constructed so that in a Tracking Area (TA), it accepts the use of an emergency call service or a VoLTE service, whereas, in the remaining area, it does not accept the emergency call service or the VoLTE service, but accepts a Circuit Switched (CS) emergency call or a CS voice call using a legacy network. The VoLTE corresponds to a method for providing a voice service using a Packet Switched (PS) network and an IMS network.

Here, whether to support the emergency call service or the VoLTE service may differ for respective network construction areas, for example, for cells or ENBs, as a small unit, and may differ for respective Tracking Areas (TAs) or MME pool areas as a larger unit.

A core network node (e,g., MME) provides the UE with an identifier indicating that the emergency call service is available or an identifier indicating that the IMS-based voice service is available when the UE performs a location registration procedure (attach or Tracking Area Update (TAU)) in an area in which the emergency call service or VoLTE is supported. In contrast, the core network node provides the UE with an identifier indicating that the emergency call service is not available or an identifier indicating that the IMS-based voice service is not available when the UE performs the location registration procedure in an area in which the emergency call service or VoLTE is not supported. If the actual UE moves between two areas in such a network construction, a domain that provides the voice service (in the case of the VoLTE, PS, and in the case of the remaining area, CS) may be changed. In the case of the UE that is registered in the IMS, the I-CSCF/S-CSCF requests the T-ADS to notify the UE to which domain (PS or CS) voice call paging is to be performed in the procedure for processing the voice call request to the UE. If the T-ADS notifies the I-CSCF/S-CSCF of the domain that will process the voice call with reference to the results that are collected from the entities of the network, the I-CSCF/S-CSCF performs the procedure that follows the voice call request with reference to the domain information.

If a user crosses the two areas as described above in a state where the user has a currently activated voice call, the emergency call service or the VoLTE may continue the emergency call service or the VoLTE service with respect to the currently ongoing voice call for the sensitivity of the voice call user. Accordingly, even if the UE moves to the emergency call or VoLTE non-acceptance area after the UE starts the emergency call or the VoLTE voice call in the emergency call or VoLTE acceptance area, the UE can maintain the currently ongoing emergency call or VoLTE voice call as it is.

If another user makes a phone call to the UE that is performing the voice call in the case where the LTE performs the emergency call or the VoLTE voice call in the emergency call or VoLTE non-acceptance area through the above-described method, a Mobile Switching Center/Visitor Location Register (MSC/VLR), to which the UE is connected, receives such a request. The MSC/VLR that has received the request sends a CS paging request to the MME. In this case, since the UE is performing the emergency call or the VoLTE voice call, the UE is in an MME-connected mode, and thus the MME sends a CS service notification message to the UE for the voice call paging through the CS domain. In this case, the UE moves the emergency call or the VoLTE voice call to a network that is different from the network being used while performing the CSFB for processing the voice call paging, and as a result, the emergency call may be disconnected.

Accordingly, there is a need for a method capable of continuously receiving the voice service for the emergency call in this case.

In the present disclosure, a method for continuously maintain the ongoing voice call is considered even in the case where the UE, which started the voice call in the TA that supports the IMS-based emergency call or VoLTE voice service, moves to a non-support TA and performs location registration.

According to a first embodiment of the present disclosure, if the UE that is in the TA in which the emergency call or VoLTE is not supported receives the CS service notification message from the MME in a state where the UE maintains the emergency call or the VoLTE, call, the UE rejects the CSFB to notify the MME that the VoLTE emergency call is ongoing. Accordingly, the UE notifies the MSC/VLR, from which the MME requested the CS paging, that the call is ongoing to perform the procedure for rejecting, the received call. As a result, in an embodiment of the present disclosure, the voice call is continuously ongoing even in the above-described case, and an opposite party that made a phone call to the UE can be notified that the UE is currently on the line.

As described above, it is specified that an embodiment of the present disclosure is applicable not only in the case of the VoLTE emergency call but also in the situation in which the VoLTE normal call is ongoing.

Further, according to a second embodiment of the present disclosure, if the MSC/VLR requests the CS paging for the UE that is in the TA in which the emergency call or VoLTE is not supported from the MME, the MME determines whether the UE is performing the emergency call or VoLTE call, entirely or partially referring to whether the Access Point Name (APN) allocated to the bearer of the corresponding UE is for emergency, whether the QoS Class Identifier (QCI) is #1, and whether the Allocation and Retention Priority (ARP) is for emergency. If the UE is performing the emergency call or VoLTE call, the MME notifies the MSC/VLR, from which the CS paging is requested, that the voice call is ongoing. In this case, the MSC/VLR may make the s voice call be continuously ongoing through performing the procedure for rejecting the received call, and may notify an opposite party that made a phone call to the UE that the UE is currently on the line.

As described above, it is specified that an embodiment of the present disclosure is applicable not only in the case of the VoLTE emergency call but also in the situation in which the VoLTE normal call is ongoing.

Further, according to a third embodiment of the present disclosure, the Home Subscriber Server (HSS) requests the MME to send information on whether an emergency call or VoLTE call is ongoing with respect to the UE that is under combined attach to the HSS and IMS registration, and updates the received information. The T-ADS requests the HSS to send information on whether the emergency call or VoLTE call is ongoing with respect to the UE, and updates the received information. Thereafter, if a phone call is made to the UE and the S-CSCF/I-CSCF requests domain selection information from the T-ADS, the T-ADS transmits a response so that the S-CSCF/I-CSCF selects the PS domain in the ease where the UE is performing the emergency call or VoLTE call. Through this, the S-CSCF/I-CSCF interrupts the paging to the CS domain so that the voice call is continuously ongoing.

Further, according to a fourth embodiment of the present disclosure, the UE that starts the emergency call or VoLTE call notifies the MME that the corresponding service has strafed, and the HSS updates the information on whether the UE is performing the emergency call or VoLTE call from the MME. The T-ADS requests the HSS to send information on whether the emergency call or VoLTE call is ongoing with respect to the UE, and updates the received information. Thereafter, if the UE receives a call and the S-CSCF/I-CSCF requests domain selection information from the T-ADS, the T-ADS transmits a response so that the S-CSCF/I-CSCF selects the PS domain in the case where the UE is performing, the emergency call or VoLTE call. Through this, the S-CSCF/I-CSCF interrupts the paging to the CS domain so that the voice call is continuously ongoing.

Hereinafter, the embodiments of the present disclosure as described above will be described, in more detail. The following embodiments can be applied to an emergency call, VoLTE call, VoLTE emergency call, and VoLTE normal call within the range in which the gist of the present disclosure is not changed, and in the following embodiments, wordings, such as the emergency call, VoLTE, VoLTE call, voice call, and VoLTE emergency call, may be mixedly used, but are not limited to any one technology.

Figure 2:
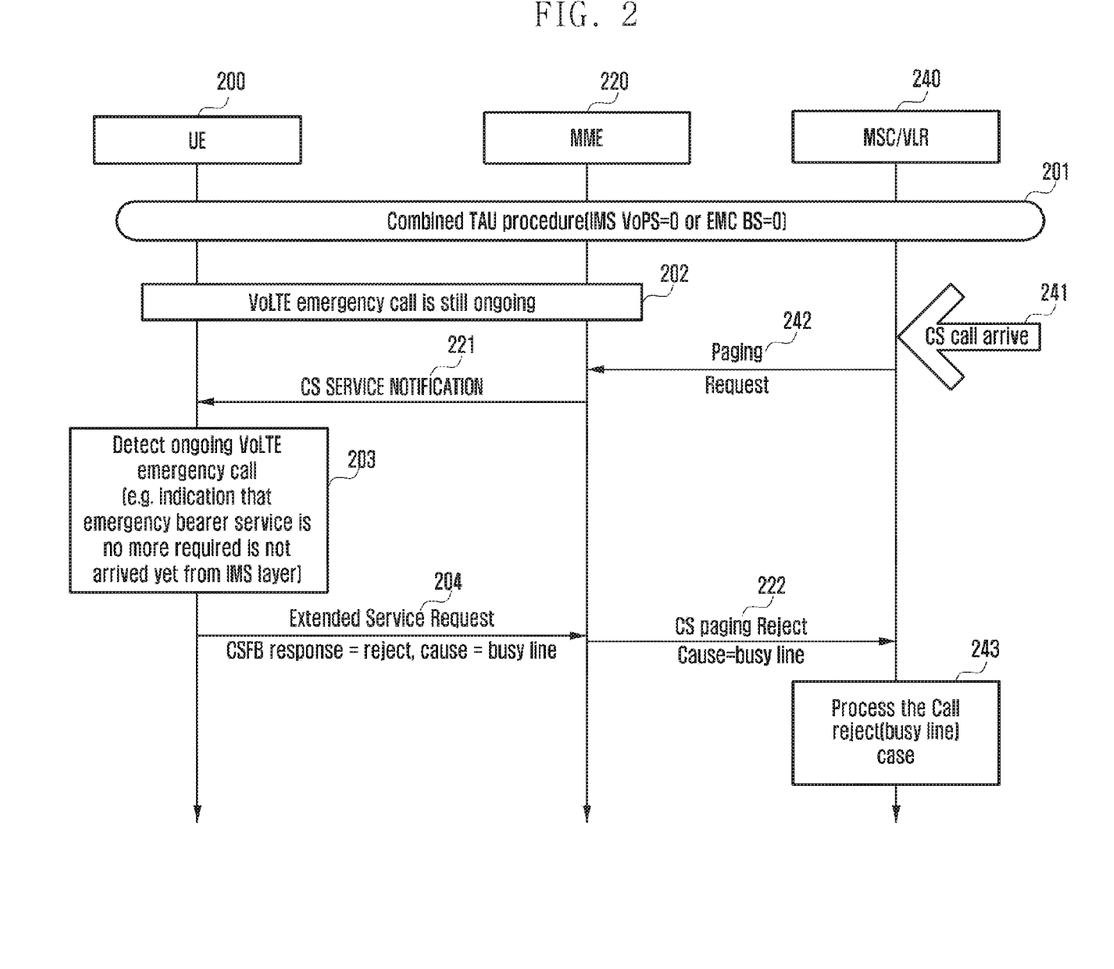
FIG. 2 is a flowchart illustrating a communication method according to a first embodiment of the present disclosure.

FIG. 2 is a flowchart illustrating a communication method according to a first embodiment of the present disclosure.

Specifically, FIG. 2 is a flowchart illustrating a communication method in which UE recognizes an emergency call or VoLTE call and rejects a CS voice call.

Referring to FIG. 2, if UE 200 that is under combined attach to a CS and a PS moves to a TA that does not exist in a TA list in a state where the UE is performing the emergency call or VoLTE call, the UE 200 performs combined TAU (201). Specifically, the UE 200 determines whether an EMC BS flag or an IMS VoPS flag is set to EMC BS flag=0 or IMS VoPS flag=0 from a TAU acceptance message that is sent by the MME 220. If the EMC BS flag is set to 0, the UE 200 recognizes that an emergency call service is not supported in the TA. If the IMS VoPS flag is set to 0, the UE 200 recognizes that VoLTE is not supported in the TA. As described above, even if the emergency call service or the VoLTE service is not supported, the ongoing voice call is continuously maintained until the service is finished (202).

On the other hand, the UE 200 is under combined attach to the CS and the PS as described above, and if another user makes a phone call to the UE 200, an IAM message is received in the MSC/VLR 240 in which the UE 200 has been registered, and the MSC/VLR 240 knows that a CS voice call is generated with respect to the UE 200 (241). Thereafter, the MSC/VLR 240 transmits a CS paging request to the MME 220 (242). Since the UE 200 is in an EMM-connected mode, the MME 240 sends a CS service notification message to the UE 200 to notify the UE 200 that the CS voice call exists (221).

The UE 200 that has received the CS service notification message may determine that the emergency call or VoLTE is continuously ongoing in the case where the notification that the emergency call or VoLTE service is not required any more is not received from the IMS layer (203). Further, the UE 200 may inquire the IMS layer whether the emergency call or VoLTE is ongoing, and may determine that the emergency call or VoLTE is ongoing in accordance with a response to the inquiry.

If it is determined that the emergency call or VoLTE is ongoing, the UE 200 may perform a procedure for rejecting the CS voice call.

In an embodiment, the UE 200 that has received the CS service notification may indicate an opposite party's phone number that is transferred to a user through the CS service notification message, and if the user rejects the CS voice call, the UE 200 may perform the procedure for rejecting the CS voice call.

In order to reject the CS voice call, the UE 200 may transmit an extended service request message, in which a CSFB response IE is included and a CSFB response value is set to 000, to the MME 220 (204). Through this, the UE 200 may notify the MME 220 that the emergency call or VoLTE call is ongoing. For example, the extended service request message may be expressed as in Table 1. Further, a CSFB failure cause IE may be expressed so that CSFB failure cause value=0001 indicates that the VoLTE call is ongoing as in Table 2.

TABLE 1

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Extended service request message identity | Message type 9.8 | M | V | 1 |

TABLE 1-continued

| IEI | Information Element | Type/Reference | Presence | Format | Length |
|---|---|---|---|---|---|
| | Service type | Service type 9.9.3.27 | M | V | ½ |
| | NAS key set identifier | NAS key set identifier 9.9.3.21 | M | V | ½ |
| | M-TMSI | Mobile identity 9.9.2.3 | M | LV | 6 |
| B- | CSFB response | CSFB response 9.9.3.5 | C | TV | 1 |
| B- | CSFB failure cause | CSFB failure cause 9.9.3.x | C | TV | 1 |
| 57 | EPS bearer context status | EPS bearer context status 9.9.2.1 | O | TLV | 4 |
| D- | Device properties | Device properties 9.9.2.0A | O | TV | 1 |

TABLE 2

| 8 | 7 | 6 | 5 | 4 | 3 | 2 | 1 | |
|---|---|---|---|---|---|---|---|---|
| CSFB failure cause IEI | | | | CSFB failure cause value | | | | octet 1 |

In an embodiment, the UE 200 may in that the emergency call or VoLTE call is ongoing through determination of a value that has not yet been used among the CSFB response values of the existing CSFB response IE. For example, as shown in Table 3, the UE 200 may set the CSFB response value to 100 to reject the CS voice call and to indicate that the emergency call or VoLTE call is ongoing as the cause of rejection.

TABLE 3

| 8 | 7 | 6 | 5 | 4 | 3 | 2 | 1 | |
|---|---|---|---|---|---|---|---|---|
| CSFB response IEI | | | | 0 spare | CSFB response value 000 = CSFB failure 001 = CSFB accept 100 = CSFB failure due to busy line | | | octet 1 |

The MME 220 that has received the extended service request message transmits a CS paging rejection message to the MSC/VLR 240 in response to the paging request 242 (222). In this case, the CS paging rejection message includes a value indicating that the VoLTE call is ongoing as the cause of rejection. For example, the CS paging rejection message may be expressed as in Table 4, and the corresponding cause of rejection (i.e., SGs Cause) may be expressed as in Table 5.

TABLE 4

| Information element | Type/Reference | Presence | Format | Length |
|---|---|---|---|---|
| Message type | Message type 9.2 | M | V | 1 |
| IMSI | IMSI 9.4.6 | M | TLV | 6-10 |
| SGs Cause | SGs Cause 9.4.18 | M | TLV | 3 |

TABLE 5

SGs cause value (octet 3)

Bits 8 7 6 5 4 3 2 1

| | |
|---|---|
| 0 0 0 0 0 0 0 0 | Normal, unspecified in this version of the protocol |
| 0 0 0 0 0 0 0 1 | IMSI detached for EPS services |
| 0 0 0 0 0 0 1 0 | IMSI detached for EPS and non-EPS services |
| 0 0 0 0 0 0 1 1 | IMSI unknown |
| 0 0 0 0 0 1 0 0 | IMSI detached for non-EPS services |
| 0 0 0 0 0 1 0 1 | IMSI implicitly detached for non-EPS services |
| 0 0 0 0 0 1 1 0 | UE unreachable |
| 0 0 0 0 0 1 1 1 | Message not compatible with the protocol state |
| 0 0 0 0 1 0 0 0 | Missing mandatory information element |
| 0 0 0 0 1 0 0 1 | Invalid mandatory information |
| 0 0 0 0 1 0 1 0 | Conditional information element error |
| 0 0 0 0 1 0 1 1 | Semantically incorrect message |
| 0 0 0 0 1 1 0 0 | Message unknown |
| 0 0 0 0 1 1 0 1 | Mobile terminating CS fallback call rejected by the user |
| 0 0 0 0 1 1 1 0 | Mobile terminating CS fallback call rejected due to line is busy |
| 0 0 0 0 1 1 1 1 to 1 1 1 1 1 1 1 1 | Normal, unspecified in this version of the protocol |

NOTE:
"Normal, unspecified" has the same meaning than in 3GPP TS 24,008 [8], informative Annex H (UMTS specific cause values for call control). It is used to report a normal event, and should not be interpreted as syntactically incorrect nor unknown if received.

The MSC/VLR 240 that has received the CS paging rejection message may perform reception rejection with respect to the received CS voice call, and in this case, the LTE that has originated the CS voice call may indicate that the UE is on the line (243).

The above-described method is applicable not only in the case of the VoLTE emergency call but also in the situation in which the VoLTE normal call is ongoing.

Figure 3:
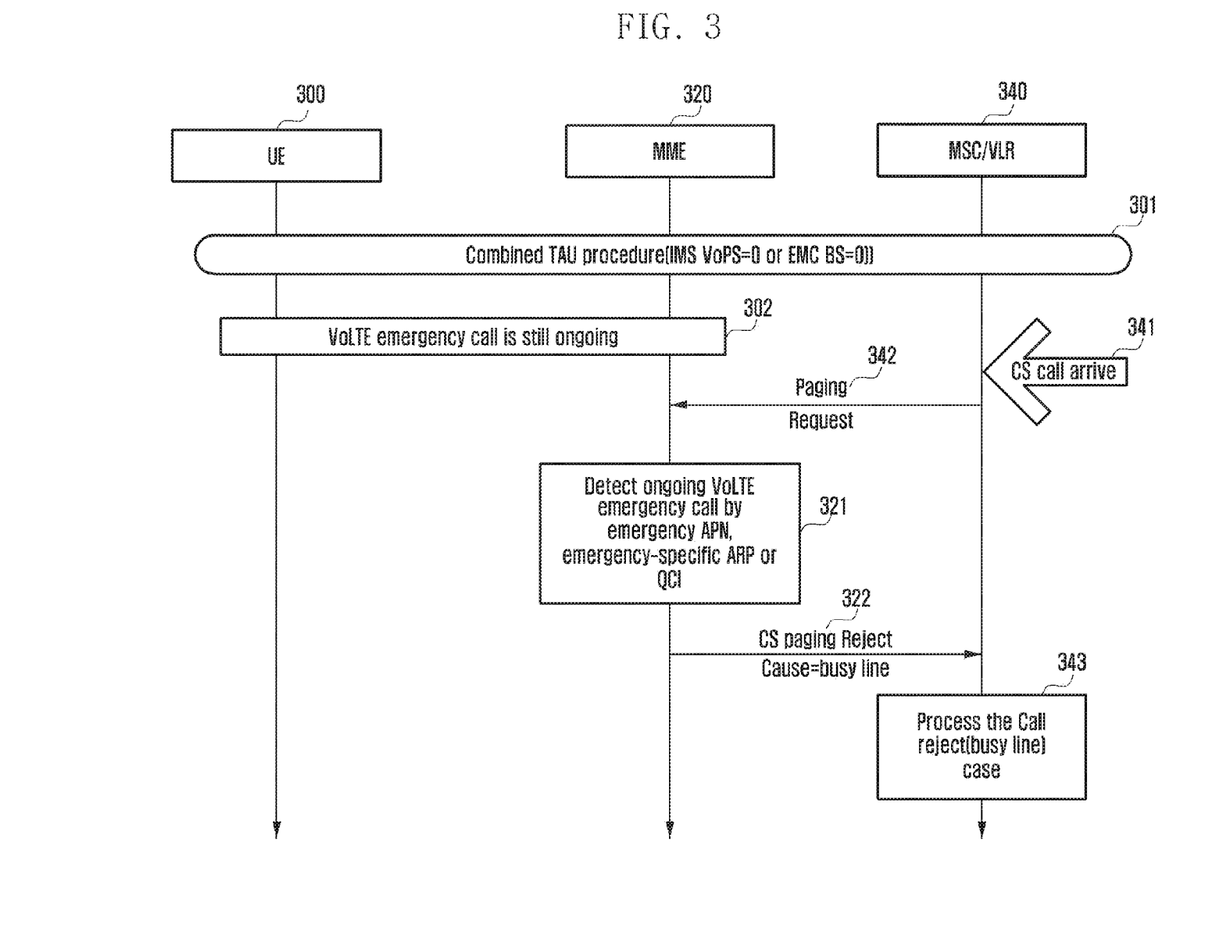
FIG. 3 is a flowchart illustrating a communication method according to a second embodiment of the present disclosure.

FIG. 3 is a flowchart illustrating a communication method according to a second embodiment of the present disclosure. Specifically, FIG. 3 is a flowchart illustrating a communication method in which MME recognizes a VoLTE emergency call service and rejects a CS voice call.

Referring to FIG. 3, if UE 300 that is under combined attach to a CS and a PS moves to a TA that does not exist in a TA list in a state where the UE is performing the emergency call or VoLTE call, the UE 300 performs combined TAU (301). Specifically, the UE 300 determines whether an EMC BS flag or an IMS VoPS flag is set to EMC BS flag=0 or IMS VON flag=0 from a TAU acceptance message that is sent by the MME 320. If the EMC BS flag is set to 0, the UE 300 recognizes that the emergency call is not supported in the TA. If the IMS VoPS flag is set to 0, the UE 300 recognizes that the VoLTE is not supported in the TA. As described above, even if the UE moves to the TA in which the emergency call or the VoLTE is not supported as described above, the ongoing VoLTE call or emergency call is continuously maintained until the service is finished (302).

On the other hand, the UE 300 is under combined attach to the CS and the PS as described above, and if another user makes a phone call to the UE 300, an IAM message is received in an MSC/VLR 340 in which the UE 300 has been registered, and the MSC/VLR 340 knows that a CS voice call is generated with respect to the UE 300 (341). Thereafter, the MSC/VLR 340 transmits a CS paging request to the MME 320 (342).

Thereafter, the MME 320 determines the emergency call or VoLTE call ongoing situation of the UE 300 (321).

In an embodiment, if the corresponding UE 300 is in an EMM-connected mode, the MME 340 may determine the VoLTE emergency call ongoing situation if the UE 300, entirely or partially referring to information on whether the APN allocated to the bearer is for an emergency call, whether the allocated ARP is for an emergency call, or whether the allocated QCI is #1, in another embodiment, the UE 300 may notify the MME 320 that the emergency call or VoLTE call starts or is finished through transmission of an ESM notification message as shown in Table 6 to the MME 320 at an emergency call or VoLTE call start or finish time. The MME 320 may determine the emergency call or VoLTE call ongoing situation of the UE 300 through the ESM notification message that is received from the UE 300.

TABLE 6

| IEI | Information Element | Type/Reference | Pres-ence | For-mat | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Notification message identity | Message type 9.8 | M | V | 1 |
| | Notification indicator | Notification indicator 9.9.4.7A | M | LV | 2 |

The value of a notification indicator that is included in the ESM notification message may include information for notifying the MME 320 that the emergency call session is created or finished as shown in Table 7.

TABLE 7

Notification indicator value (octet 3)

Bits 8 7 6 5 4 3 2 1

| | |
|---|---|
| 0 0 0 0 0 0 0 1 | SRVCC handover cancelled, IMS session re-establishment required (sec 3GPP TS 23.216 [8]) |
| 0 0 0 0 0 0 1 0 | IMS emergency session established |
| 0 0 0 0 0 0 1 1 | IMS emergency session established |
| 0 0 0 0 0 1 0 0 To 0 1 1 1 1 1 1 1 | Unused, shall be ignored if received by the UE |

All other values are reserved

If the UE 300 knows that the emergency call service is impossible through a TAU process, it may notify the MME 320 whether the emergency call or VoLTE call of the UE is ongoing using the ESM notification message. Further, when starting or ending the emergency call or VoLTE call, the UE 300 may transmit the ESM notification message to the MME 320 so that the MME 320 can be continuously notified of whether the emergency call or VoLTE call of the UE 300 is ongoing. This will be described in more detail in a fourth embodiment.

In an embodiment, if the MME 320 is changed, the UT 300 may transfer whether the emergency call or VoLTE call of the UE is ongoing to the target MME.

In the determination process as described above, if it is determined that the VoLTE emergency call is ongoing. The MME 320 transmits a CS paging rejection message to the MSC/VLR 340 in response to the paging request (322). The CS paging rejection message includes a value indicating that the emergency call or VoLTE call is ongoing as the cause of rejection. For example, the CS paging rejection message may be expressed as in Table 4 as described above, and the corresponding cause of rejection (i.e., SGs Cause) may be expressed as in Table 5 as described above.

The MSC/VLR 340 that has received the CS paging rejection message may perform reception rejection with respect to the received CS voice call, and in this case, the UE that has originated the CS voice call may indicate that the UE is on the line (343).

It is specified that the above-described method is applicable not only in the case of the VoLTE emergency call but also in the situation in which the VoLTE normal call is ongoing.

Figure 4:
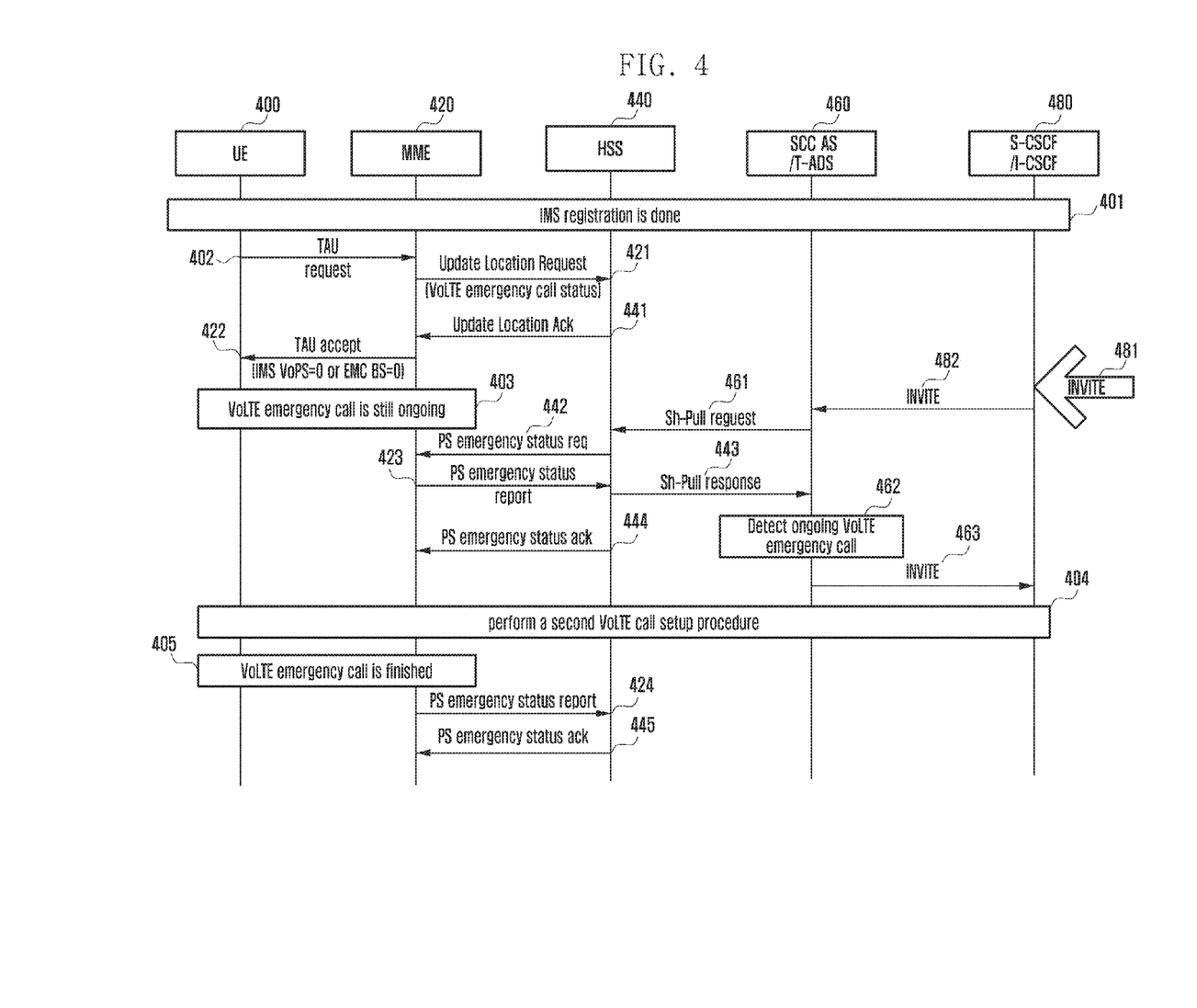
FIG. 4 is a flowchart illustrating a communication method according to a third embodiment of the present disclosure.

FIG. 4 is a flowchart illustrating a communication method according to a third embodiment of the present disclosure. Specifically, FIG. 4 is a flowchart illustrating communication method in which T-ADS recognizes a VoLTE emergency call service and operates not to generate a CS paging.

Referring to FIG. 4, UE 400 completes its registration in an IMS (401), and is under combined attach to a CS and a PS that service an emergency call or a VoLTE call. In the case where the UE 400 moves to a TA that does not exist in a TA list, the UE 400 performs combined TAU. Specifically, the UE 400 transmits a TAU request message to an MME 420 (402), and the MME 420 that has received the TAU request message requests a location update from an HSS 440 (421).

In this case, the MME 420 determines whether the emergency call or the VoLTE call is currently ongoing in the UE 400. FIG. 4 illustrates that the MME 420 determines whether the emergency call or the VoLTE call is currently ongoing in the UE 400, but is not limited thereto. Another network device (e,g., SCC AS/T-ADS 460) may also be implemented to perform such determination.

In an embodiment, the MME 420 may determine whether the emergency call or VoLTE call is currently ongoing in the UE 400, entirely or partially referring to information that indicates whether the APN allocated to the bearer is for an emergency call, whether the allocated ARP is for an emergency call, or whether the allocated QCI is #1.

In another embodiment, the UE 400 may notify the MME 420 that the emergency call or VoLTE call starts or is finished through transmission of an ESM notification message as shown in Table 6 to the MME 420 at an emergency call or VoLTE call start or finish time. The value of a notification indicator that is included in the ESM notification message may include information for notifying the MME 420 that the emergency call session is created or is finished (a packet-based voice service for the UE starts or is finished) as shown in Table 7.

If the UE 400 knows that the emergency call service is impossible through a TAU process, it may notify the MME 420 whether the emergency call or VoLTE call of the UE is ongoing using the ESM notification message. Further, when starting or ending the emergency call or VoLTE call, to the UE 400 may transmit the ESM notification message to the MME 420 so that the MME 420 can be continuously notified of whether the emergency call or VoLTE call of the UE 400 is ongoing. This will be described in more detail in a fourth embodiment.

In an embodiment, if the MME 420 is changed, the UE 400 may transfer whether the emergency call or VoLTE call of the UE is ongoing to the target MME.

If the VoLTE emergency call is currently ongoing in the UE 400 although the emergency call of VoLTE is not supported in the corresponding TA, the MME may include a VoLTE emergency call status indicator for notifying that the VoLTE emergency call service is ongoing in the TA in which the emergency call service or VoLTE is not supported in the location update request message.

The HSS 440 that has received the location update request message maintains the VoLTE emergency call status, and thereafter, updates whether to perform the VoLTE emergency call through operations 442 and 443 or operations 423 and 444.

The HSS 440 transmits a confirmation message for the location update request message to the MME 420 (441), and the UE 200 sets an EMC BS flag or an IMS flag to EMC BS flag=0 or IMS VoPS flag=0 in a TAU acceptance message to notify the UE that the emergency call or VoLTE is not supported in the TA (422). However, the VoLTE emergency call is continuously maintained until the service is finished (403).

Further, in the case where the MME 420 does not know the emergency call ongoing situation of the UE 400, the UE 400 may notify the MME 420 that the emergency call starts or is finished through transmission of the ESM notification message as disclosed in Table 6 and Table 7 to the MME 420 after receiving the TAU acceptance message. That is, if the emergency call or VoLTE call is continuously ongoing in a state where the IMS VoPS or EMC BS is set to 0 in the TAU acceptance message and it is recognized that the emergency call or VoLTE is not supported in the current TA, the UE may transmit the ESM notification message to the MME 420 to notify to the MME 420 that the emergency call or VoLTE call has started. The MME 420 that has received the ESM notification message may transfer information on whether the emergency call or VoLTE call is ongoing to the HSS 440.

On the other hand, the HSS 440 may transfer a PS emergency status request message for updating the VoLTE emergency call status periodically or non-periodically to the MME 420 after receiving the VoLTE emergency call status at operation 421 (442). The MME 420 receives the PS emergency status request message from the HSS 440, or periodically or non-periodically transfers information on whether to perform the VoLTE emergency call to the HSS 440 through the PS emergency status report message (423). Further, in the case where the HSS 440 requests the information from the MME 420, it may transfer the confirmation message 444 for the PS emergency status report message 423 to the MME 420.

Accordingly, if another user makes a phone call to the UE 400, the SCC AS/T-ADS 460 may request information on the UE 400 from the HSS 440 (461), and the HSS 440 may transfer a message including the information on whether the VoLTE call or emergency call is ongoing to the SCC AS/T-ADS 460 (443).

As an example, if an invite message including information on the UE 400 arrives at the S-CSCF/I-CSCF 480 in order to make a phone call to the UE 400 (481), the S-CSCF/I-CSCF 480 resends the invite message to the SCC-AS/T-ADS 460 (482). The SCC-AS/T-ADS 460 may send a message Sh-Pull request to the HSS 440 in order to request subscriber information, UE location information, and information on whether the VoLTE emergency call is ongoing to service the voice call (461). The HSS 440 that has received the message Sh-Pull request may carry information stored therein or, if needed, information that is collected through requesting of necessary information from another network entity, such as the MME 420, on the message Sh-Pull response, and may send the message Sh-Pull response to the SCC-AS/T-ADS 460 (433). In particular, if the VoLTE emergency call status is received from the MME 420 at operation 421 in a state where the UE is under combined attach and is registered in the IMS at the same time, or the corresponding Public Land Mobile Network (PLMN) does not homogeneously provide the VoLTE service or the emergency call service, the HSS 440 may collect information on whether the emergency call or VoLTE call for the UE is ongoing from the MME 420 through operations 442 and 423 or operations 423 and 444.

On the other hand, the SCC-AS/T-ADS 460 that has received an information message Sh-Pull response 443 for the UE determines whether the VoLTE call or emergency call for the LTE is ongoing using the information, and selects a domain for servicing the voice call to the UE. For example, if the UE 400 is recognized as the UE which is under combined attach and in which the VoLTE emergency call is ongoing (462), the SCC-AS/T-ADS 460 may send the invite message the S-CSCF/I-CSCF 480 so as to page the voice call through the PS domain (463). Further, the SCC-AS/T-ADS 460 may send an SIP 486 (User Busy) message to the S-CSCF/I-CSCF 480 so that a voice call connection attempt does not occur in the UE 400 in which the VoLTE call or emergency call is ongoing, and this the UE 400 may operate to reject the voice call attempt.

The S-CSCF/I-CSCF 480 that has received the invite message performs a VoLTE voice call setup process in accordance with the existing procedure.

On the other hand, if the ongoing VoLTE emergency call service is :finished (405), the MME 420 notifies the HSS 440 that the VoLTE call or emergency call is completed through the PS emergency status report message (424). Then, the HSS 440 may transfer a confirmation message to the PS emergency status report message to the MME 420 (445).

Figure 5:
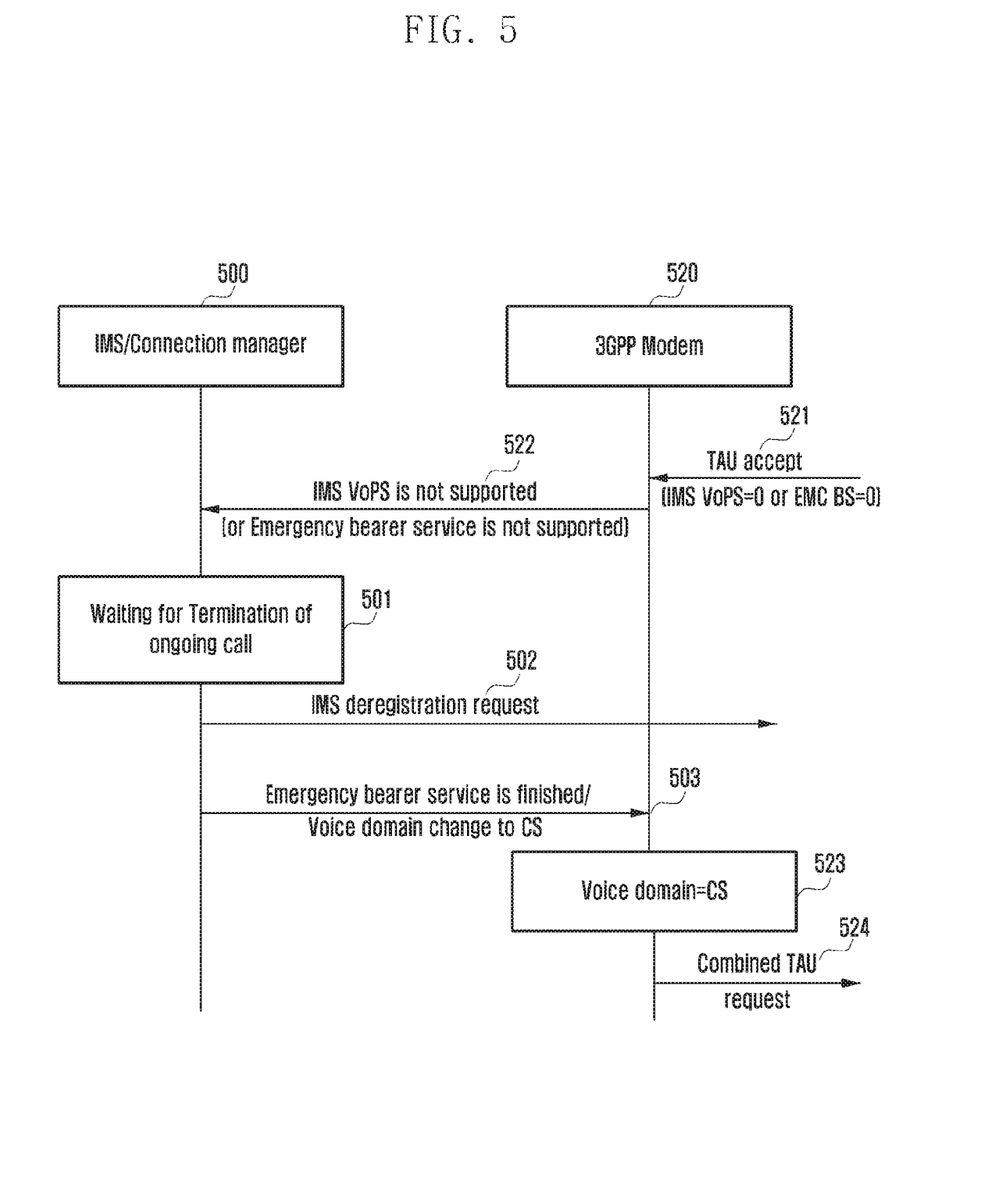
FIG. 5 is a diagram illustrating mutual interaction between a 3GPP modem layer and an IMS/connection manager layer in UE.

FIG. 5 is a diagram illustrating mutual interaction between a 3GPP modern layer and an IMS/connection manager layer in UE. Specifically, FIG. 5 illustrates mutual interaction between a 3GPP modem layer 520 that takes charge of a function related to a 3GPP access network in the UE and an IMS/connection manager layer 500 that manages IMS and overall communication functions.

The two layers may be directly connected to each other, or a Radio Interface Layer (RIL) may be interposed between the two layers. If the 3GPP modem receives a TAU acceptance message in which IMS VoPS=0 (VoLTE is not supported) or EMC BS=0 (Emergency bearer service is not supported) is set (521), the 3GPP modem notifies the IMS/connection manager that the emergency call service or the IMS VoPS is no more supported through the RIL layer or using an Application Programmable Interface (API) (522). If the currently ongoing voice call is finished (501), the IMS/connection manager that has received this transmits an SIP message for requesting IMS deregistration (502), and if the emergency call or VoLTE call is finished, the IMS/connection manager notifies the 3GPP modem that the emergency call service or VoLTE service is finished (503). Further, the IMS/connection manager may notify the 3GPP modem that a voice domain is to be changed to the CS. The 3GPP modem layer that has received the notification changes the voice domain to the CS (523), and if needed (if the preceding TAU process is not a combined type), the 3GPP modem layer performs a combined TAU process (524).

In FIG. 5, the interaction between the IMS/connection manager layer and the 3GPP modem layer is described as the request/command and an operation related thereto. However, this is merely exemplary, and the 3GPP modem, which is the primary subject of the present disclosure, and which receives that the IMS VoPS is not supported from the TAU acceptance message, performs IMS deregistration process based on this, and changes the domain of the voice service that is subsequently generated to the CS (or CSFB), can be applied to operations having slight modifications.

Figure 6:
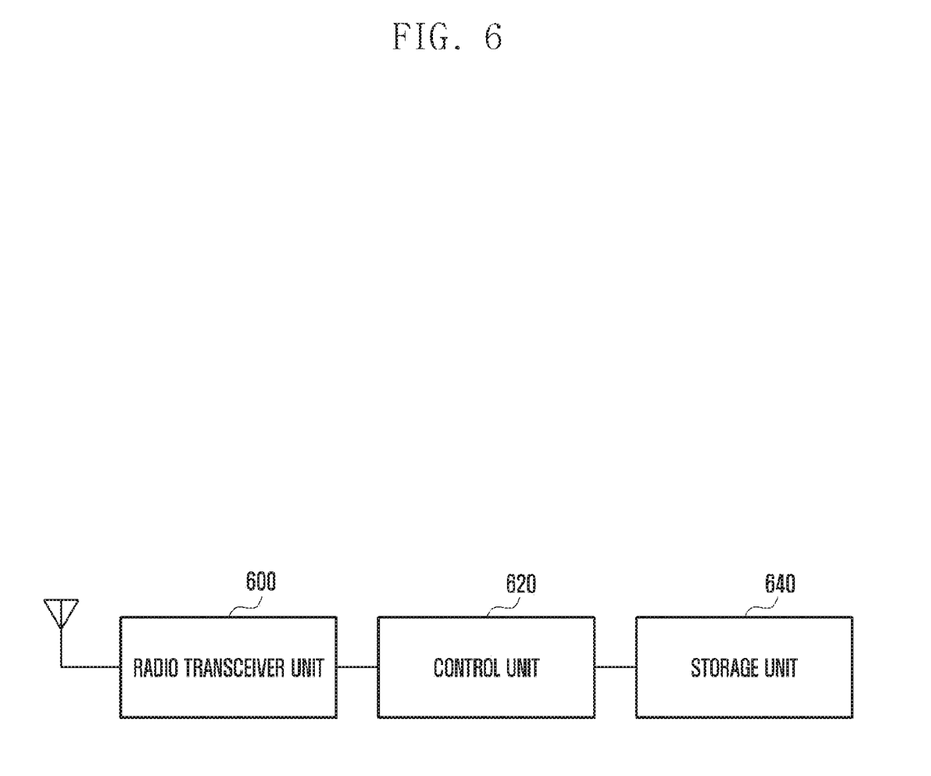
FIG. 6 is a diagram illustrating the configuration of UE that operates according to a preferred embodiment of the present disclosure.

FIG. 6 is a diagram illustrating the configuration of a network device that operates according to various embodiments of the present disclosure. Referring to FIG. 6, a network device according to various embodiments of the present disclosure may include a radio transceiver unit 600, a control unit 620, and a storage unit 640. The network device of FIG. 6 may correspond to any one of the UT, MME, HSS, SCC AS/T-ADS, and S-CSCF/I-CSCF, but is not limited thereto. Hereinafter, functions of the respective units will be described on the basis of the UE.

The radio transceiver unit 600 receives information on whether IMS VoPS or an emergency call is supported from the network, and transmits/receives a registration related message under the control of the control unit 620.

The control unit 620 determines whether to perform an IMS deregistration process, is determines whether a VoLTE voice call or a VoLTE emergency call is ongoing according to the above-described embodiments, or changes a domain of a voice service.

In the storage unit 640, various kinds of information that are required to operate the UE according to an embodiment of the present disclosure may be stored. For example, whether the IMS VoPS is supported or whether the VoLTE voice call or VoLTE emergency call is ongoing for each TA may be stored.

Referring to FIGS. 5 and 6 in association with each other, the radio transceiver unit 600 of FIG. 6 may correspond to the 3GPP modem layer 520 of FIG. 5, and the control unit 620 of FIG. 6 may correspond to the IMS/connection manager layer of FIG. 5.

As described above, the functions of the respective units have been described on the basis of the UE. However, other network devices excluding the UE can include the radio transceiver unit 600, the control unit 620, and the storage unit 640, and the respective units can perform the functions according to the respective embodiments of the present disclosure.

Figure 7:
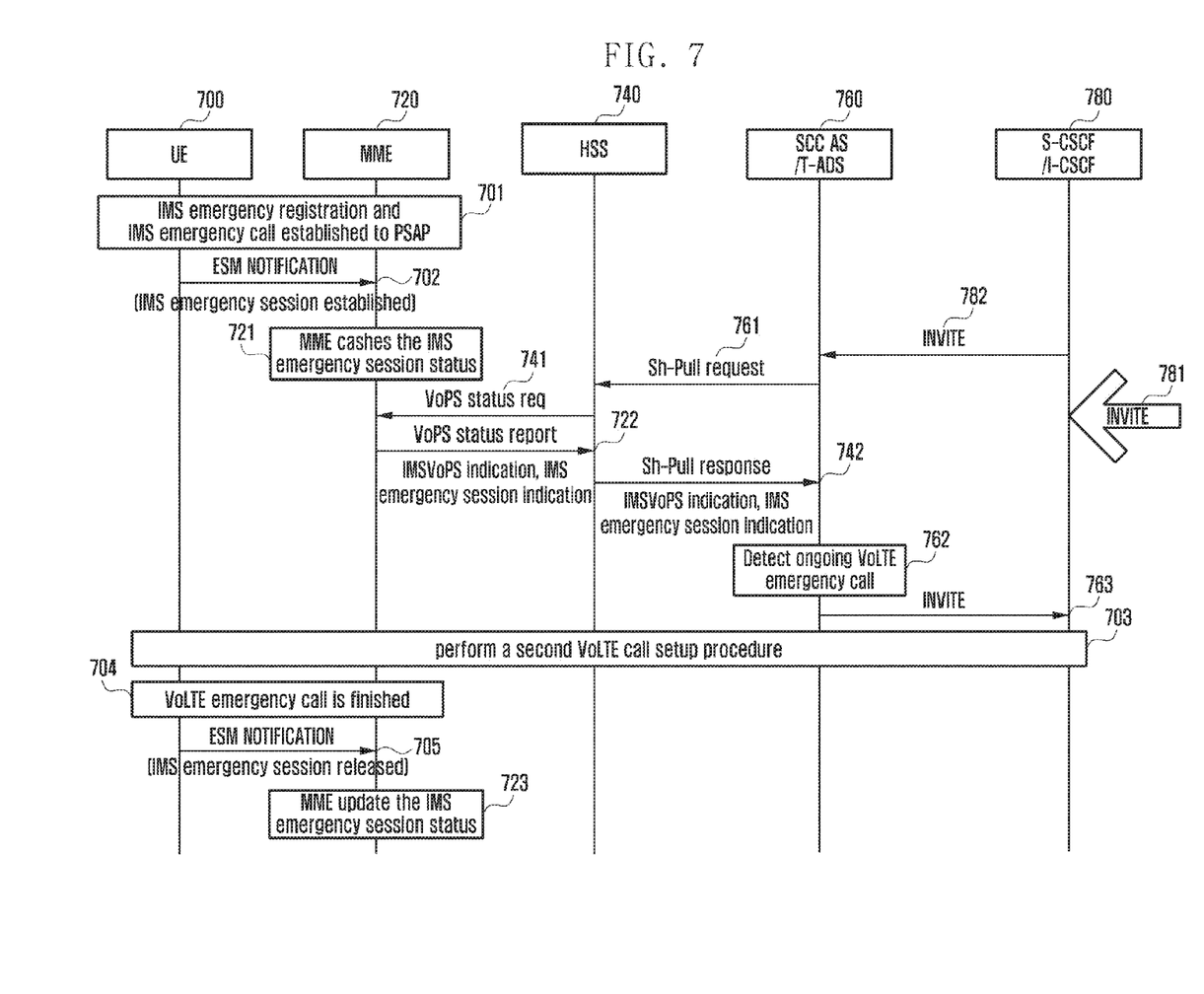
FIG. 7 is a flowchart illustrating a communication method according to a fourth embodiment of the present disclosure.

FIG. 7 is a flowchart illustrating a communication method according to a fourth embodiment of the present disclosure. Specifically, FIG. 7 is a flowchart illustrating a method in which T-ADS recognizes an emergency call or VoLTE service and operates not to generate a CS paging. Hereinafter, for convenience in explanation, the fourth embodiment of the present disclosure will be described around the emergency call. However, the following embodiment can he applied even to a VoLTE emergency call or a VoLTE normal call in addition to the emergency call.

Referring to FIG. 7, UE 700 completes IMS emergency call registration, and starts the emergency call (701). The UE 700 recognizes the start of the emergency call through reception of an SIP 200 OK message that indicates the start of the emergency call, and transmits an ESM notification message as described in Table 6 to an MME 720 in order to notify the MME 720 of the start of an emergency call service. The value of a notification indicator that is included in the ESM notification message may include information for notifying the MME 720 that an emergency call session as described in Table 7 is created.

In this case, the MME 720 stores information indicating that the emergency call is ongoing in the UE 700. For example, the MME 720 stores VoLTE emergency call status=ON with respect to the UE 700, and even in the case where the MME is changed in accordance with movement of the UE 700, it transfers the VoLTE emergency call status information to a target MME together with context information of the UE 700 so that whether the emergency call service is ongoing can be continuously recognized. Further, after completing the TAU process, the UE 700 may send the ESM notification message as at operation 702 to the MME 720 so that the target MME can continuously recognize whether the emergency call service is ongoing.

When receiving a VoPS status request message 741 from an HSS 740, the MME 720 transfers information on whether the VoLTE call is ongoing and whether the emergency call is ongoing to the HSS 740 through a VoPS status report message 722.

Unlike this, according to a method in which the HSS 740 stores the information on whether the VoLTE call is ongoing and whether the emergency call is ongoing, at operation 702, the UE 700 notifies the MME 720 that an emergency call session is created through the ESM notification message, and the MME sends a notification message for notifying the HSS 740 whether the emergency call session is created to the HSS 740. In this case, the HSS 740 stores that the emergency call is ongoing with respect to the UE 700. For example, the HSS 740 stores VoLTE emergency call status=ON.

On the other hand, if another user makes a phone call to the UE 700, an SCC AS/T-ADS 760 may request information on the UE 700 from the HSS 740 (761), and the HSS 740 may transfer information on whether the VoLTE call or emergency call is ongoing to the SCC AS/T-ADS 760 (742).

As an example, if an invite message including information on the UE 700 arrives at an S-CSCF/I-CSCF 780 in order to make a phone call to the UE 700 (781), the S-CSCF/I-CSCF 780 resends the invite message to the SCC-AS/T-ADS 760 (782). The SCC-AS/T-ADS 760 may send a message Sh-Pull request to the HSS 740 in order to request subscriber information, UE location information, and information on whether the VoLTE call or emergency call is ongoing to service the voice call (761). The HSS 740 that has received the message Sh-Pull request may carry information stored therein or, if needed, information that is collected through requesting of necessary information from another network entity, such as the MME 720, on the message Sh-Pull response, and may send the message Sh-Pull response to the SCC-AS/T-ADS 760 (733). For example, the HSS 740 may notify the SCC-AS/T-ADS 760 whether the VoLTE call or emergency call service is ongoing through IMS VoPS indication or IMS emergency session indication.

In particular, in the case of the UE 700 which is under combined attach and is registered in the IMS at the same time, or in the case where a corresponding Public Land Mobile Network (PLMN) does not homogeneously provide the VoLTE service or the emergency call service, the HSS 740 may collect information on whether the emergency call is ongoing from the MME 720 through operations 741 and 722.

On the other hand, the SCC-AS/T-ADS 760 that has received an information message Sh-Pull response 742 for the UE selects a domain for servicing the voice call to the UE using the information. For example, if the UE 700 is recognized as the UE which is under combined attach and in which the VoLTE emergency call is ongoing (762), the SCC-AS/T-ADS 760 may send the invite message to the S-CSCF/I-CSCF 780 so as to page the voice call through the PS domain (763). Further, the SCC-AS/T-ADS 760 may send an SIP 486 (User Busy) message to the S-CSCF/I-CSCF 780 so that a voice call connection attempt does not occur in the UE 700 in which the VoLTE call or emergency call is ongoing, and thus the UE 700 may operate to reject the voice call attempt.

The S-CSCF/I-CSCF 780 that has received the invite message performs a VoLTE voice call setup process in accordance with the existing procedure.

On the other hand, if the ongoing VoLTE emergency call service is finished (704), the UE 700 may notify the MME 720 that the emergency call is finished through an SIP 200 OK or SIP BYE. Further, the UE 700 sends an IMS deregistration message to the MME 720, and if it is recognized that the emergency call service is no more used, the UE 700 sends the ESM notification message as in Table 6 to the MME 720 in order to notify the MME 720 that the emergency call service is finished (705).

The value of a notification indicator that is included in the ESM notification message may include information for notifying the MME 720 that an emergency call session as described in Table 7 is released. In this case, the MME 720 stores information indicating that the emergency call is finished with respect to the UE 700. For example, the MME 720 stores VoLTE emergency call status=OFF with respect to the UE 700.

In contrast, according to a method in which the HSS 740 stores the information on whether the VoLTE call is ongoing and whether the emergency call is ongoing, at operation 705, the MME 720, which is notified of the finish of the emergency call session through the ESM notification message, sends a notification message fix notifying the HSS 740 that the emergency call session is finished to the HSS 740, and in this case, the HSS 740 stores that the emergency call is finished with respect to the UE 700. For example, the HSS 740 stores VoLTE emergency call status=OFF with respect to the UE 700.

Meanwhile, preferred embodiments of the present disclosure disclosed in this specification and drawings and specific terms used therein are illustrated to present only specific examples in order to clarify the technical contents of the present disclosure, but various modifications may be made within the limit that does not deviate from the scope of the present disclosure. For example, configurations of at least two of the first to fourth embodiments may be partially mixed. The scope of the present disclosure is not limited to the embodiments as described above, but should be defined, by the appended claims and their equivalents.

The invention claimed is:

1. A communication method for a network device that supports a packet-based voice service in a mobile communication system, comprising:
  recognizing that User Equipment (UE) is located, in a Tracking Area (TA) in which the packet-based voice service is not supported on the basis of a message that is received from a Home Subscriber Server (HSS);
  if a call request message for the UE is received, determining whether a VoLTE call or an emergency call for the UE is ongoing; and
  if the VoLTE call or the emergency call for the UE is ongoing, selecting a packet switched domain as a domain for the received call request message.

2. The communication method of claim 1, wherein the determining whether the emergency call for the UE is ongoing comprises:
  requesting and receiving information on whether the emergency call for the UE is ongoing from the HSS; and determining whether the emergency call for the LTE is ongoing on the basis of the received information on whether the emergency call for the UE is ongoing.

3. The communication method of claim 2, wherein the information on whether the emergency call for the LTE is ongoing is included in a location update request message that the HSS receives from a Mobility Management Entity (MME).

4. The communication method of claim 1, wherein if the emergency call for the UE starts or is finished, the UE transmits an ESM notification message that includes information on a start or finish of the emergency call to the MME.

5. The communication method of claim 1, wherein the determining whether the VoLTE call or the emergency call for the UE is ongoing comprises determining whether the VoLTE, call or the emergency call for the UE is ongoing on the basis of at least one of an Access Point Name (APN) allocated to a bearer of the UE, QoS Class Identifier (QCI) information, and Allocation and Retention Priority (ARP) information.

6. The communication method of claim 1, wherein the network device is a Terminating Access Domain Selection (T-ADS) or Service Centralization and Continuity Application Server (SCC AS).

7. The communication method of claim 1, further comprising:
if the call request message is received, transmitting a Sh-Pull request message to the HSS; and
receiving information on the ongoing VoLTE call or emergency call for the UE from the HSS.

8. The communication method of claim 1, further comprising, if the packet switched domain is selected as the domain for the received call request message, transmitting the call request message to an S-CSCF/I-CSCF.

9. A network device that supports a packet-based voice service in a mobile communication system, comprising:
a transceiver; and
a controller coupled with the transceiver and configured to control to: recognize that User Equipment (UE) is located in a Tracking Area (TA) in which the packet-based voice service is not supported on the basis of a message that is received from a Home Subscriber Server (HSS), determine whether a VoLTE call or an emergency call for the UE is ongoing if a call request message for the UE is received, and select a packet switched domain as a domain for the received call request message if the VoLTE call or the emergency call for the UE is ongoing.

10. The network device of claim 9, wherein the controller requests and receives information on whether the emergency call for the UE is ongoing from the HSS, and determines whether the emergency call for the UE is ongoing on the basis of the received information on whether the emergency call for the UE is ongoing.

11. The network device of claim 10, wherein the information on whether the emergency call for the UE is ongoing is included in a location update request message that the HSS receives from a Mobility Management Entity (MME).

12. The network device of claim 9, wherein if the emergency call for the UE starts or is finished, the UE transmits an ESM notification message that includes information on a start or finish of the emergency call to the MME.

13. The network device of claim 9, wherein the controller determines whether the VoLTE call or the emergency call for the UE is ongoing on the basis of at least one of an Access Point Name (APN) allocated to a bearer of the UE, QoS Class Identifier (QCI) information, and Allocation and Retention Priority (ARP) information.

14. The network device of claim 9, wherein the network device is a Terminating Access Domain Selection (T-ADS) or Service Centralization and Continuity Application Server (SCC AS).

15. The network device of claim 9, wherein the controller transmits a Sh-Pull request message to the HSS if the call request message is received, and receives information on the ongoing VoLTE call or emergency call for the UE from the HSS.

16. The network device of claim 9, wherein the controller transmits the call request message to an S-CSCF/I-CSCF if the packet switched domain is selected as the domain for the received call request message.

* * * * *